(12) United States Patent
Doser

(10) Patent No.: US 8,401,081 B2
(45) Date of Patent: Mar. 19, 2013

(54) ACCURATE MOTION PORTRAYAL FOR DISPLAY AND DIGITAL PROJECTORS

(75) Inventor: Ingo Tobias Doser, Burbank, CA (US)

(73) Assignee: Thomson Licensing, Boulogne-Billacourt (FR)

( * ) Notice: Subject to any disclaimer, the term of this patent is extended or adjusted under 35 U.S.C. 154(b) by 842 days.

(21) Appl. No.: 12/310,156

(22) PCT Filed: Aug. 11, 2006

(86) PCT No.: PCT/US2006/031473
§ 371 (c)(1),
(2), (4) Date: Feb. 11, 2009

(87) PCT Pub. No.: WO2008/018882
PCT Pub. Date: Feb. 14, 2008

(65) Prior Publication Data
US 2009/0237563 A1 Sep. 24, 2009

(51) Int. Cl.
*H04N 7/12* (2006.01)
(52) U.S. Cl. ............... 375/240.16; 386/226; 386/229; 386/292; 386/298
(58) Field of Classification Search ............ 375/240.16; 386/226, 229, 292, 298
See application file for complete search history.

(56) References Cited

U.S. PATENT DOCUMENTS

| 4,296,434 A | 10/1981 | Drewery et al. |
| 5,546,120 A | 8/1996 | Miller et al. |
| 2004/0056981 A1 | 3/2004 | Hamamura et al. |
| 2005/0068289 A1* | 3/2005 | Diefenbaugh et al. ........ 345/102 |
| 2005/0134735 A1* | 6/2005 | Swartz ........................ 348/554 |
| 2006/0012675 A1 | 1/2006 | Alpaslan et al. |
| 2006/0093998 A1* | 5/2006 | Vertegaal ...................... 434/236 |
| 2006/0112334 A1* | 5/2006 | Endrikhovski et al. ....... 715/700 |
| 2006/0280249 A1* | 12/2006 | Poon ........................ 375/240.16 |

FOREIGN PATENT DOCUMENTS

| EP | 0877274 | 11/1998 |
| EP | 0946066 | 9/1999 |
| EP | 1143747 | 10/2001 |
| EP | 1404109 | 3/2004 |
| EP | 1482732 | 12/2004 |
| EP | 1544836 | 6/2005 |
| JP | 09294279 | 11/1997 |
| JP | 11341518 | 12/1999 |

(Continued)

OTHER PUBLICATIONS

Wang, "Motion-compensation 100Hz TV eliminates flickers and judders," IIC-China/ESC-China 2002, Conference Proceedings, pp. 267-270.

(Continued)

*Primary Examiner* — Joseph Ustaris
*Assistant Examiner* — Anner Holder
(74) *Attorney, Agent, or Firm* — Robert D. Shedd; Jeffrey D. Hale

(57) ABSTRACT

A system and method for motion portrayal manipulation includes performing a motion estimation to determine objects in motion in content provided at an acquisition rate. An eye motion trajectory of a viewer is predicted based on the content to determine a region of interest. An object in the area of interest is filtered along an object trajectory to adapt motion of the object to permit display of the acquisition rate on a display device having a refresh rate other than the acquisition rate. The content is portrayed at the acquisition rate on the display device.

25 Claims, 14 Drawing Sheets

FOREIGN PATENT DOCUMENTS

| | | |
|---|---|---|
| JP | 2004120247 | 4/2004 |
| JP | 2006086705 | 3/2006 |
| JP | 2006094058 | 6/2006 |
| JP | 2007096842 | 4/2007 |
| JP | 2007508732 | 4/2007 |
| WO | WO2005031424 | 4/2005 |
| WO | WO2005055587 | 6/2005 |

OTHER PUBLICATIONS

Chai et al., "3-D Motion and Structure Estimation using Inertial Sensors and Computer Vision for Augmented Reality," Submitted to Presence: Teleoperators and Virtual Environments, vol. 11, No. 5, Oct. 1992, pp. 474-492.

Okano et al., "Real-time three-dimensional pickup and display system based on Integral Photography," SPIE Conference on Novel Optical Systems Design and Optimization II, SPIE vol. 3430, San Diego, CA, Jul. 20-21, 1998, pp. 70-79.

Arai et al., "Gradient-index lens-array method based on real-time integral photography for three-dimensional images," Applied Optics, vol. 37, No. 11, Apr. 10, 1998, pp. 2034-2045.

Eihenlaub et al., "A Prototype flat panel hologram-like display that produces multiple perspective views at full resolution," Stereoscopic displays and virtual reality systems II, Proc. of SPIE meeting, San Jose, CA, Feb. 7-9, 1995, vol. 2409, pp. 102-112.

Stampe et al., "Low Cost Software-Based Rendering and Stereoscopic Interfaces for Teleoperation and Virtual Reality," Agard, Virtual Interfaces: Research and Applications, 1994, Information Delivery Dept. at Georgia Tech Library, Toronto, Canada, 8 pages.

Knocke et al., "Concept, design and analysis of a large format autostereoscopic display system," Optical Design and Engineering II, Proc. of SPIE Int. Soc. Opt. Eng., vol. 5962, 11 pages, Sep. 13-16, 2005.

Spain, "Effects of Extended Camera Baseline and Image Magnification on Target Detection Time and Target Recognition with a Stereoscopic TV System," Naval Ocean Systems Center, Feb. 1986, 38 pages, San Diego, CA, abstract only available.

Matusik et al., "3D TV: A Scalable system for Real-Time Acquisition, Transmission, and Autostereoscopic Display of Dynamic Scenes," Mitsubishi Electric Research Laboratories, Cambridge, MA, ACM Trans Graphics, vol. 23, No. 4, pp. 814-824, Aug. 8, 2004.

Kim et al., "Analysis of the viewing parameters for curved lens array system based on integral imaging," Proc. of SPIE-IS&T Electronic Imaging, SPIE, vol. 5664, pp. 421-429. Jan. 17, 2005.

Suehiro et al., "Integral 3D imaging system using monocular 2D video and depth data," Proc. of SPIE-IS&T Electronic Imaging, SPIE vol. 5664, pp. 230-240, 2005, Jan. 17, 2005.

Takahashi et al., "Camera system for arbitrary viewpoint 3D display system," Stereoscopic Displays and Virtual Reality Systems XII Proc. SPIE Int. Soc. Opt. Eng., vol. 5664, San Jose, CA, pp. 83-91, Jan. 17-20, 2005.

Vetro et al., "Coding Approaches for End-to-End 3D TV Systems," Picture Coding Symposium, Dec. 15-17, 2004, Mitsubishi Electric Research Laboratories, Cambridge, MA, pp. 319-324.

Park et al., "Implementation of Projection-type Autostereoscopic Multiview 3D Display System for Real-time Applications," Proc of SPIE-IS&T Electronic Imaging, 2004, pp. 245-254, SPIE vol. 5291, Jan. 19, 2004.

Higashi et al., "The Three Dimensional Display for User Interface in Free Viewpoint Television system," Proc. of SPIE-IS&T Electronic Imaging, pp. 237-244. SPIE vol. 5291.

International Search Report, dated May 11, 2007.

Hann: "IC for Motion-Compensated de-Interlacing, Noice Reduction and Picture-Rate Conversion", IEEE Transactions on Consumer Electronics, vol. 45, No. 3, Aug. 1, 1999, pp. 617-624.

\* cited by examiner

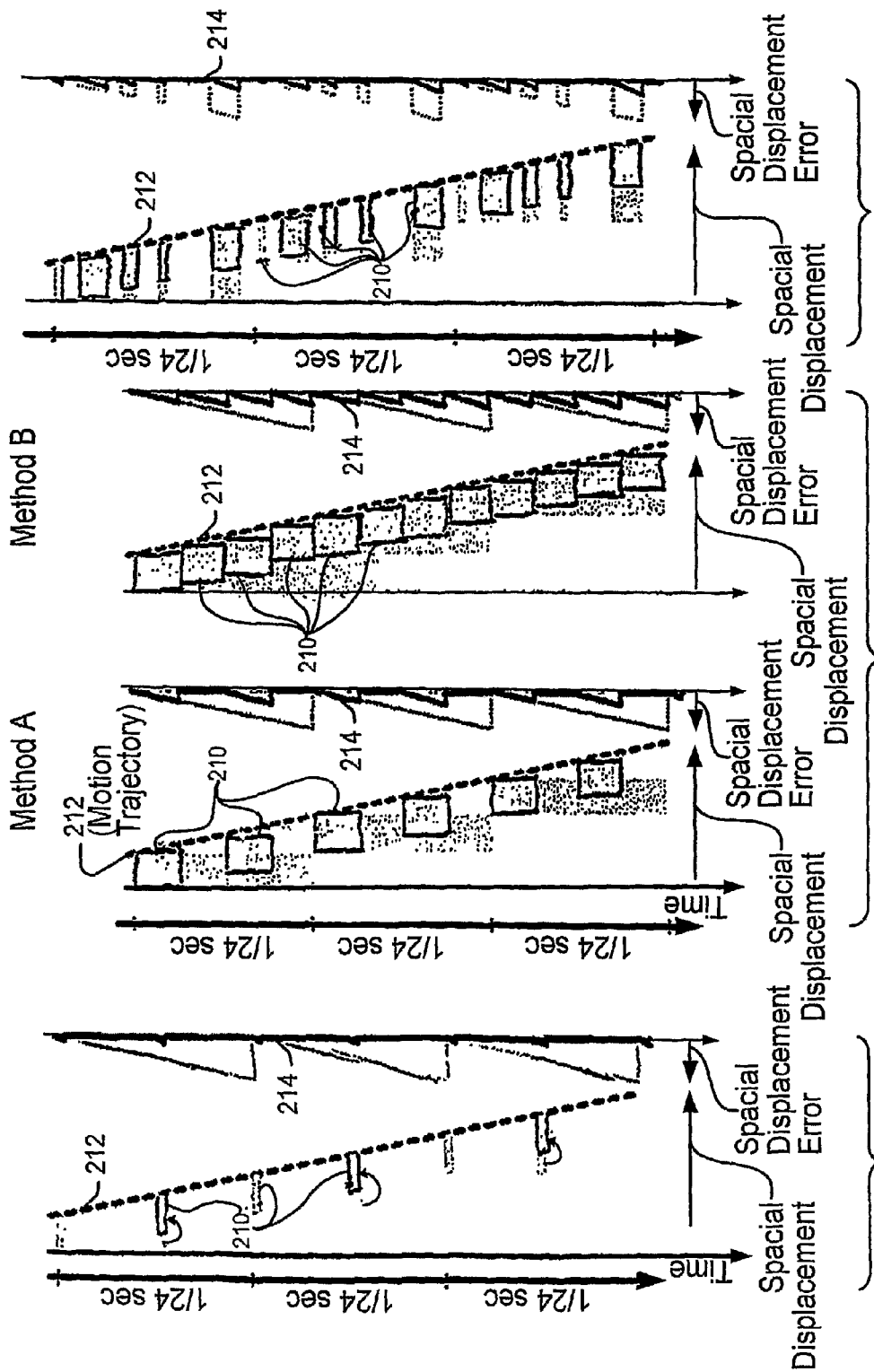

| Source Frame No | Display Frame No | Apply Spatial Filter with length as a fraction of the number of pixels on the Motion Trajectory | And offset as a fraction of pixels on the Motion Trajectory |
|---|---|---|---|
| 1 | 1 | 0.625 | 0 |
| 1 | 2 | 0.625 | 0.25 |
| 2 | 3 | 0.5 | 0.5 |
| 2 | 4 | 0.125 | 0 |
| 2 | 4 | 0.25 | 0.75 |
| 2 | 5 | 0.375 | 0 |

FIG.10

ACCURATE MOTION PORTRAYAL FOR DISPLAY AND DIGITAL PROJECTORS

This application claims the benefit, under 35 U.S.C. §365 of International Application PCT/US2006/31473, filed on Aug. 11 2006, which was published in accordance with PCT Article 21(2) on Feb. 14, 2008.

FIELD OF THE INVENTION

The present invention generally relates to digital display technology and, more particularly, to systems and methods for improving, restoring and controlling motion portrayal on displays and digital projectors.

BACKGROUND OF THE INVENTION

Picture material such as movies or television broadcasts are typically shot on film cameras or digital video capturing devices. These devices permit a defined way of motion portrayal, for example, by means of camera pan speed versus film speed or shutter speed. On the viewing end, however, this motion portrayal cannot currently be preserved, as it depends mostly on the display technology and manufacturers implementations of this technology.

Different display technologies can result in a different portrayal of on-screen motion. This may be undesirable as the intention of the filmmaker or the full impact of the scene may be lost due to an undesirable action effect portrayal. Therefore, a need exists for a system and method that portrays the rendering of on-screen action in a more reliable way.

SUMMARY OF THE INVENTION

A method for motion portrayal manipulation includes determining a region of interest based on eye motion trajectory of a viewer viewing content provided at an acquisition rate, and filtering the at least one object in the region of interest for adapting motion of the one object for display at the acquisition rate on a display having a refresh rate other than the acquisition rate. The filtering preferably filters the objects using a spatial filter having a filter length determined by a number of pixels crossed in the eye motion trajectory modified by a control parameter that is determined by a relationship between an intended display duration versus the actual display duration.

An apparatus for motion portrayal manipulation includes a mechanism for determining at least one object in motion in content, a predictor for predicting an eye trajectory of a viewer viewing the at least one object, and a controller for filtering the at least one object to adapt motion that object for display at the acquisition rate on a display having a refresh rate other than the acquisition rate. Preferably, the spatial filter has a filter length determined by a number of pixels crossed in the eye motion trajectory divided by a control parameter that includes one of a film shutter speed and a film rate.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 4 is a diagram demonstrating spatial displacement correction using motion compensation for a CRT display in accordance with present principles;

FIG. 5 is a diagram demonstrating methods for spatial displacement correction using motion compensation for LCD displays in accordance with present principles;

FIG. 6 is a diagram demonstrating spatial displacement correction using motion compensation for a PLASMA or DLP display in accordance with present principles;

FIG. 10 is a table showing frame sequences which illustratively show the emulation of film judder on a CRT display in accordance with an illustrative embodiment;

Figure 1:
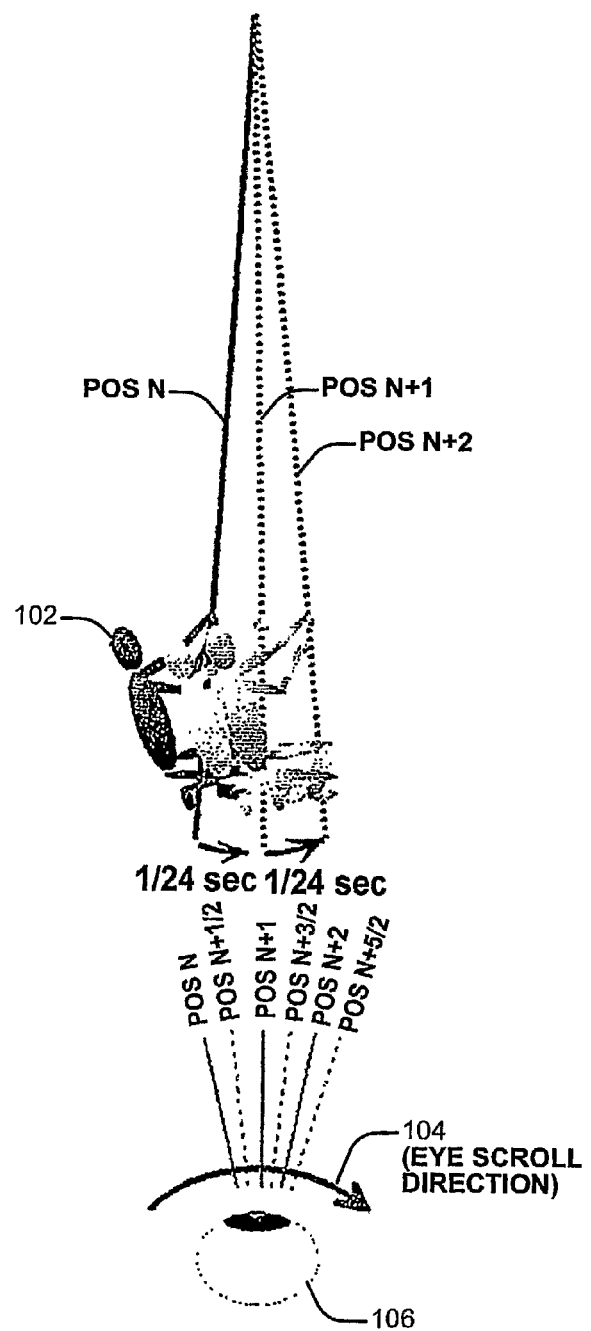
FIG. 1 is schematic diagram demonstrating concepts of object motion and eye trajectory in accordance with present principles.

It should be understood that the drawings are for purposes of illustrating the concepts of the invention and are not necessarily the only possible configuration for illustrating the invention.

DETAILED DESCRIPTION OF THE INVENTION

The present invention provides a system and method for controlling motion portrayal for various display technologies. A control or adjustment mechanism for motion portrayal on various displays may be employed in conjunction with a picture signal from broadcast or recorded data, e.g., to have signaling mechanisms to tell the display what behavior to adapt to. The control mechanism preferably works with motion registration; however, to improve the performance and reduce system cost, some or all motion registration could be performed prior to or with picture encoding for transmission or storage. The motion registration may be transmitted/stored for playback on the display.

As an additional feature of embodiments for motion portrayal control, beyond the use of just preserving camera motion behavior, motion portrayal control could be used to convey additional degrees of freedom for motion portrayal to a filmmaker. The spatial and temporal domains in the human visual system (HVS) cannot be treated separately, therefore it is possible to exchange some properties and still reach the same visual result or effect.

Some of the Terminology that will be employed herein includes the following:

Motion Blur=An object becomes unsharp as soon as the object itself moves relative to the focal point on the eye. The object has to follow a motion trajectory on the HVS's retina which can cause smearing of the image.

Motion Judder or Judder=Some displays cause a jumping back and forth on the retina when the object moves relative to the focal point of the eye.

Sigma Type of Display=A Display that emits all light in a sigma pulse type of manner, CRT's are an example.

Sample and Hold Type of Display =Displays that have constant light emission but refresh the picture data with every picture period, e.g., liquid crystal displays (LCDs).

PWM (pulse width modulation) display =These are displays that temporally modulate the light emitted from a pixel counting on accumulation in the HVS, e.g., PLASMA displays.

MoPoCo=Motion Portrayal Control

It is to be understood that the present invention is described in terms of a video recording and display systems; however, the present invention is much broader and may include any digital multimedia display system, which is capable of portraying motion.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Motion can be portrayed in film camera in accordance with the shutter speed and/or the film speed. Motion can also be portrayed for a digital camera using shutter speed, using analog to digital (A/D) gain and/or using frame rate. A digital photographic (DP) device has control over the motion performance, and provides a point of reference. A cinematographer has the ability to define the capture of a motion scene to film or to video by the shutter speed. The variations in light throughput can be compensated for by means of changing the aperture, and/or by means of changing the film speed on film cameras and the A/D gain on video cameras.

Scene capturing and display refresh rates: In current movie systems, the acquisition refresh rate and the display refresh rate are not the same. There is one decision that leads to an acquisition refresh rate and there is another decision that leads to a display refresh rate. There are at least two factors that usually determine the two refresh rates. These factors include technology limitations and artistic intent.

In a traditional situation, 24 frames per second has been the acquisition rate for the better part of a half a century. In theatres, among other reasons, it was found helpful to suppress flicker by means of a shutter that doubled the display frame rate to 48 Hz.

Other kinds of displays were used only rarely in the film making process, for instance for color timing. For television, the film was put through a telecine. The telecine produced an interlaced scanning of the film and worked in a 2-2 pulldown mode for PAL television and 3-2 pulldown for NTSC. The televisions worked either in a 50 Hz mode or in a 60 Hz mode, depending on the transmission standard locally used.

It was probably perceived that the motion behavior of television displays, which all were CRT displays at the time, was different from the motion behavior in theatres. However, with the screen sizes available and the viewing situations, this was found to be sufficient.

Today, there are more choices of refresh rate in scene capturing by means of digital acquisition. But there are also many more ways for displaying representations. For Home Video/DVD, the filmmaker usually gets to see just the CRT version of the movie prior to the release. This has led to the problem that the viewer almost never gets what the filmmaker intends for the viewer to see.

Referring now in specific detail to the drawings in which like reference numerals identify similar or identical elements throughout the several views, and initially to FIG. 1, different motion behavior on different displays can cause motion judder especially on traditional displays (e.g., CRTs and screens in film theatres). An example with 24 feet per second (fps) rendering is given in FIG. 1. In this (fast motion) example, it would take a FIG. 102 about 2 seconds to make a 180 degree swing. The shutter speed would be at speeds of say around $\frac{1}{500}$ seconds so it can be assumed that there is no motion blurring caused by the acquisition device. A human eye's motion 104 is shown following the scene. An eye or human visual system (HVS) 106 follows the object 102 on the screen. In this example, assume that a CRT display is used since this display type resembles the sigma type of display more than a film projector.

For CRT's at post production as well as film projectors in cinemas, a frame doubling is performed. The sequence of display on a double frame rate display may be: POS (Position) N; POS N; POS N+1; POS N+1; POS N+2. The display could be a CRT that operates at 48 Hz vertical frequency, for example. The source material is film at 24 frames per second.

The human visual system (HVS) 106, which is following the moving object, on the other hand expects a new motion phase with every picture refresh. The expected sequence is: POS N; POS N+½; POS N+1; POS N+1½; POS N+2; POS N+2½. It can be seen that there is a discrepancy between the acquisition and the portrayal.

To render the picture correctly on the retina, the eyeball should actually move in steps, move by $\frac{1}{48}^{th}$ of a second, and then remain for $\frac{1}{48}^{th}$ of a second, then move on for $\frac{1}{48}^{th}$ of a second and so forth. This cannot be expected from a human eye, which moves in a continuous fashion. As a result, there is a displacement of the image on the retina on every other picture display. The motion of the object will then look as if it was moving forth and back. For example: forward by 1½ motion phases, then backwards by ½ a motion phase, then forward by 1½ motion phases and so forth. Thereby creating motion judder.

The judder described may be considered an artifact, but it can also be regarded as intended behavior. Judder can be used to create a particular mood or artistic statement. Therefore, before changing or adjusting the judder, the filmmaker should first be consulted.

Figure 2:
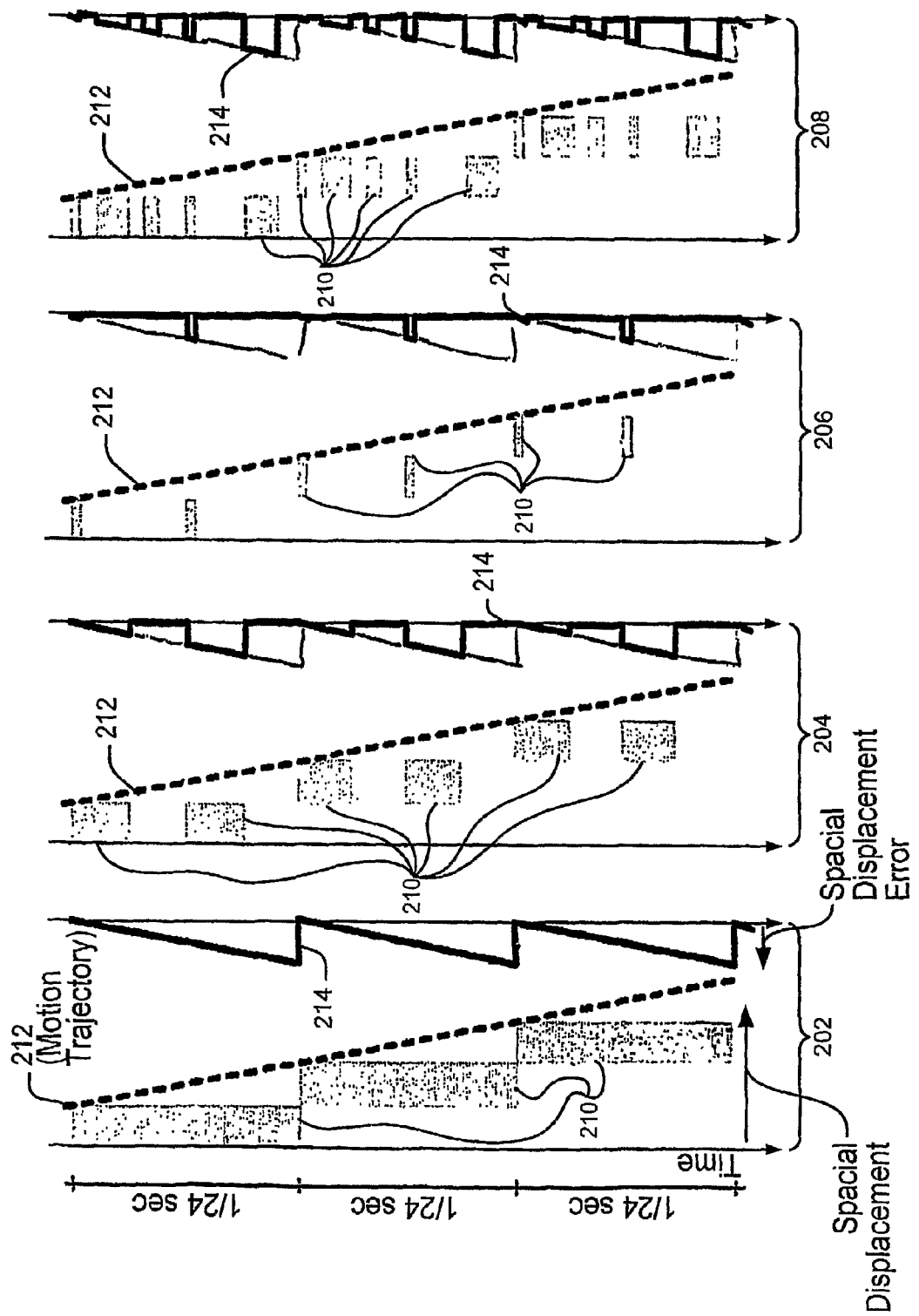
FIG. 2 is a diagram demonstrating -concepts of object motion, eye trajectory and displacement error for a plurality of display types in accordance with present principles.

Referring to FIG. 2, film motion performance is illustratively shown on different display types. Four candidates 202, 204, 206 and 208 for display are shown. Candidate 202 includes a sample and hold display with thin-film transistor-liquid crystal display (TFT-LCD) technology. Candidate 204 includes sample and hold display with half cycle shutter displays as used for film projection in theatres. Candidate 206 includes a sigma type display, where CRT's are considered to have such kind of characteristic even though they have a non-zero phosphor decay time. Candidate 208 includes a PWM (Pulse Width Modulation) display where in principle the display includes a 1 bit display and relies on the temporal integration of the eye to produce a grey scale value with PLASMA and DLP (digital light processing) as example technologies.

The motion rendition by the Human Visual System (HVS) can be explained using FIG. 2. From left to right: bars 210 show light emission at a one-dimensional spatial position. A diagonal dotted line 212 shows a motion trajectory that an eye is following. A variable line 214 shows the object displacement error on the retina as a result of the eyeball motion and the type of display.

Displacement error: Assuming a source refresh rate of 24 frames per second, the different display technologies lead to different displacement errors 214 on the retina. FIG. 2 attempts to compare the overall motion performance among the different display types. FIG. 2 is presented for illustrative purposes. Several other parameters and HVS characteristics should be considered when providing such a comparison. FIG. 2 demonstrates that motion behavior is very different between different display types.

Motion can only look natural when there is one sigma type display refresh cycle per motion phase. In other words, an object that moves from a1 (x1,y1) to a2 (x2,y2) along a motion trajectory m21 looks good if it is displayed once at position a1 and once at position a2. The display duration should ideally be 0. Of course this is not feasible because zero display time also means zero light.

Figure 3:
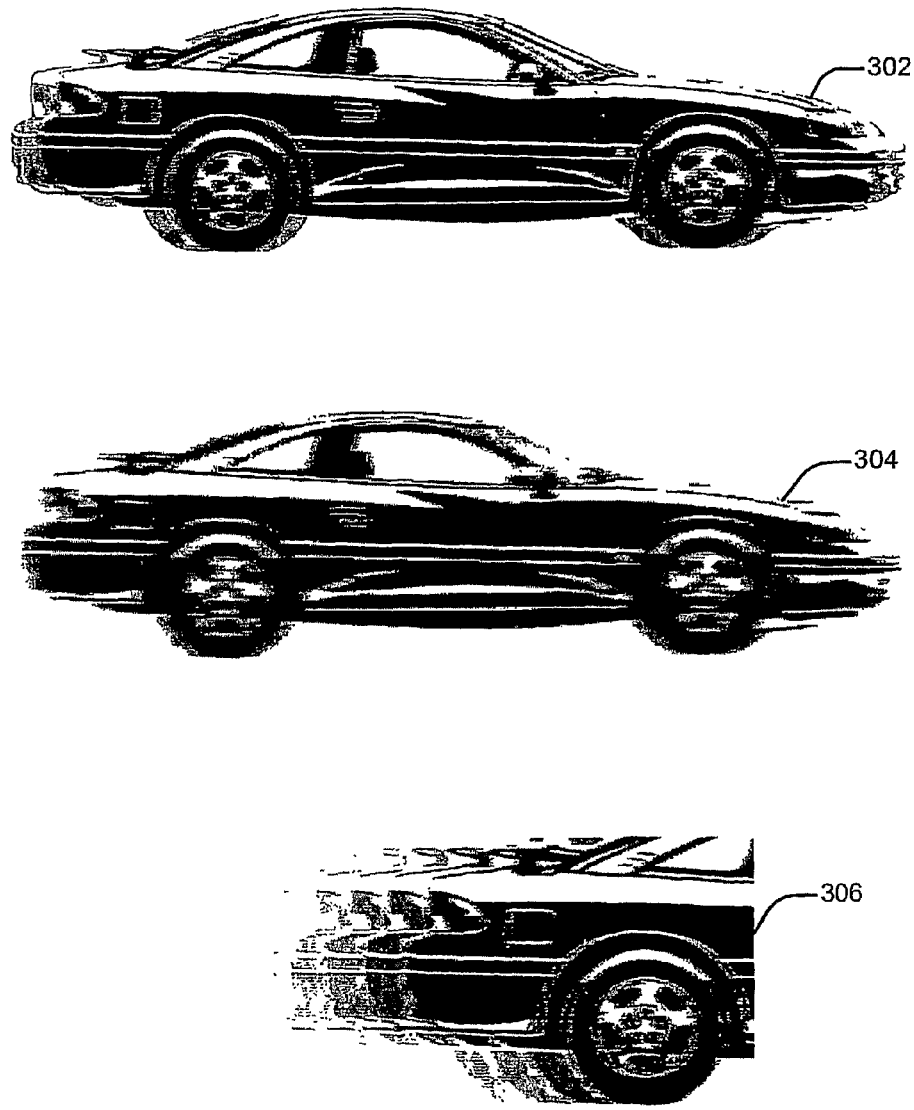
FIG. 3 is a pixel image demonstrating object motion for a plurality of display types in accordance with present principles.

Referring to FIG. 3, the difference between a double-sigma type of display 302, a sample and hold type of display 304 and an example of a moving car when watched on a PWM display are illustratively depicted. The double-sigma refers to displaying film on a CRT which is yet the most ideal example of a sigma type display. The CRT displays 24 Hz material at a 48 Hz refresh rate. The sample and hold may include an LCD display, and the PWM may include a PLASMA or DLP display type.

Motion judder control may be eliminated or reduced by providing motion compensation. Film motion judder can be eliminated almost completely on CRT displays by means of motion compensation. Prior art solutions include integrated circuits that provide motion compensation as shown in FIG. 4.

Referring to FIG. 4, spatial displacement correction is illustratively shown using motion compensation for a CRT display.

Judder correction may be provided for other display types such as for LCD, PLASMA and DLP. These displays can be judder corrected with a same type of algorithm. LCD displays can be forced to a higher picture fresh rate of, say, 96 Hz, and three of the four then quadrupled pictures are spatially corrected by means of motion compensation (See e.g., FIG. 5, Method B). An alternative method could be to modulate the background light in combination with motion compensation of one of the two then doubled pictures (See e.g., FIG. 5, Method A).

Judder elimination is one optional feature of the present invention, and as such it is useful to understand the outlined concepts for judder control. In FIG. 5, spatial displacement correction is illustratively shown for two methods (A and B) for motion of an LCD display. In FIG. 6, spatial displacement correction is illustrated for motion compensation in PLASMA (and DLP) displays.

Whatever type of display is used, it may or may not be an ideal sigma type of display. Furthermore, if there is no new motion phase per refresh period, then crosstalk of the spatial and temporal domain is unavoidable. The behavior that can then be observed is different among the different display categories. For example, a CRT (with fast phosphors) can come pretty close to the ideal if one displays one motion phase per refresh cycle and the refresh rate is large enough. TFT-LCD displays, on the other hand, as they are widely available today, characterize the other extreme, with a strong spatial-temporal crosstalk. Movie film projectors fall somewhere between. Light is not exposed to the film 100% of the time; it is typically about 50% of the time due to the film transport mechanism. Furthermore, it features a double shutter technique to reduce the flicker.

What is projected on the retina of the human eye is an important consideration. The following categories can be classified: A. Background Picture moves and eyes stand still focusing on the still foreground object; B. Background Picture stands still and eyes move following a moving foreground object; and C. Eyes follow a foreground object and the background picture moves as well.

To have a complete match between acquisition and portrayal, all cases should be considered. The eye movement can be assumed to be predictable, it is deemed to follow the region of interest, so eye movement can be derived from the content. However, a person can also force themselves to not follow this rule and stare at one point in a picture (case B). In that case, the viewer experiences false compensation if a blurring was applied in that situation. Therefore it is difficult to make the compensation on still backgrounds.

Film projector motion judder, if desired, can be achieved on non-film projection display devices by emulating the same spatio-temporal crosstalk as is produced by the film projector.

Figure 7A:
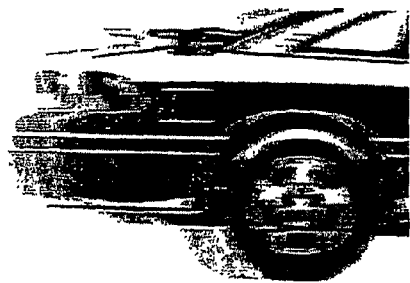
FIGS. 7A and 7B are pixels images demonstrating movie film judder and CRT display judder, respectively.
Figure 7B:
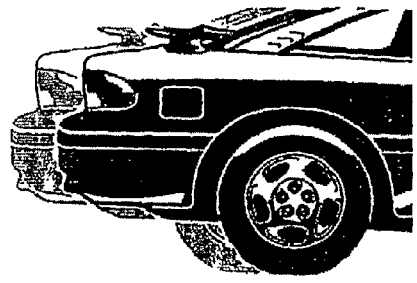

A comparison of film projector motion judder (FIG. 7A) and CRT film judder (FIG. 7B) is illustratively shown. The emulation of movie judder on a CRT display may include, e.g., a display that works on 48 Hz or 50 Hz in 2:2 pulldown. In one example, the motion portrayal of the film (shown in FIG. 7A) is emulated in FIG. 7B on a CRT where the image is rendered on a CRT (or other sigma type display). Double imaging is unusually sharp in FIG. 7B as the judder effect is exaggerated on such kind of display.

Figure 8:
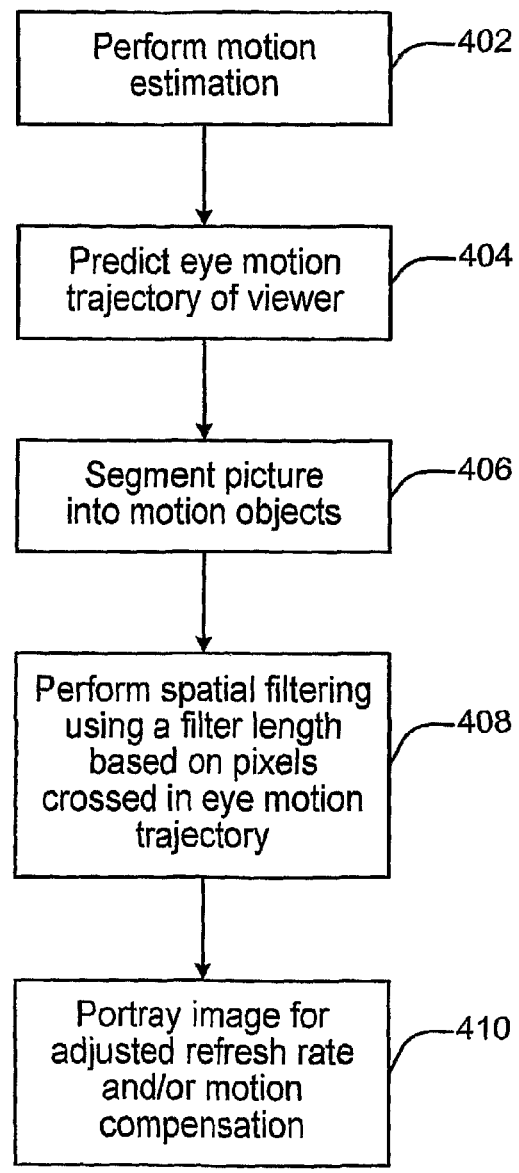
FIG. 8 is a block/flow diagram showing a method for emulation of film judder on a display in accordance with an illustrative embodiment.

Referring to FIG. 8, a method for portraying images on a display that retain the film appearance and look is illustratively shown. To retain the film projector look on a CRT display that has a vertical frequency of twice the film frame rate, the following steps may be performed. In block 402, a motion estimation of the motion picture is performed. Moving objects and their positions are determined. In block 404, the eye motion of the viewer is predicted. The eye motion is deemed to follow a region of interest. In block 406, the picture is segmented into motion objects. One object is determined as a group of pixels with the same motion trajectory relative to the eye. Segmentation may not be needed in any case. In block 408, perform a spatial low pass filter along the motion trajectory. The filter is preferably a rectangular, directional filter. The filter length is determined by the number of pixels along the eye motion trajectory that are crossed during one display picture frame divided by 2 due to the half cycle shutter. Other filters and filtering methods may also be employed. The steps of blocks 402, 404 and 406 may be performed on the display side, or they could be performed while authoring the film. In block 410, the translated or adjusted images are portrayed at the acquisition rate or as intended rate. In addition, motion compensation may be applied.

It should be noted that the acquisition rate may include a desired rate of the filmmaker. For example, a desired rate may be determined at acquisition, during editing or during display. The acquisition rate may be controlled, e.g., by metadata added to the content. It should also be understood that the acquired content may be recorded on a media, such as film, DVD, CD, hard drive, floppy disk or the like or broadcast directly, e.g., in live TV or other network transmission (e.g., IP delivery, Internet broadcast, cable or satellite broadcast).

Figure 9:
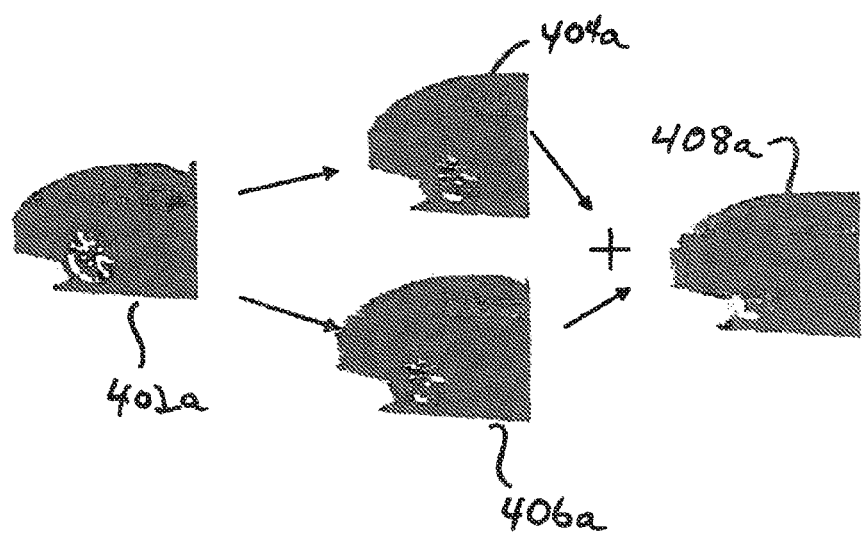
FIG. 9 is a schematic diagram showing emulation of film judder on a CRT display in accordance with FIG. 8.

FIG. 9 shows the steps outlined above. The images of FIG. 9 are labeled corresponding to the find numbers of the above steps (402*a* corresponds to 402, 404*a* corresponds to 404, 406*a* corresponds to 406 and 408*a* corresponds to 408). It should be understood that different frame rates can be translated from the camera, broadcasting equipment or recorded media to a display or projectors.

Figure 11:
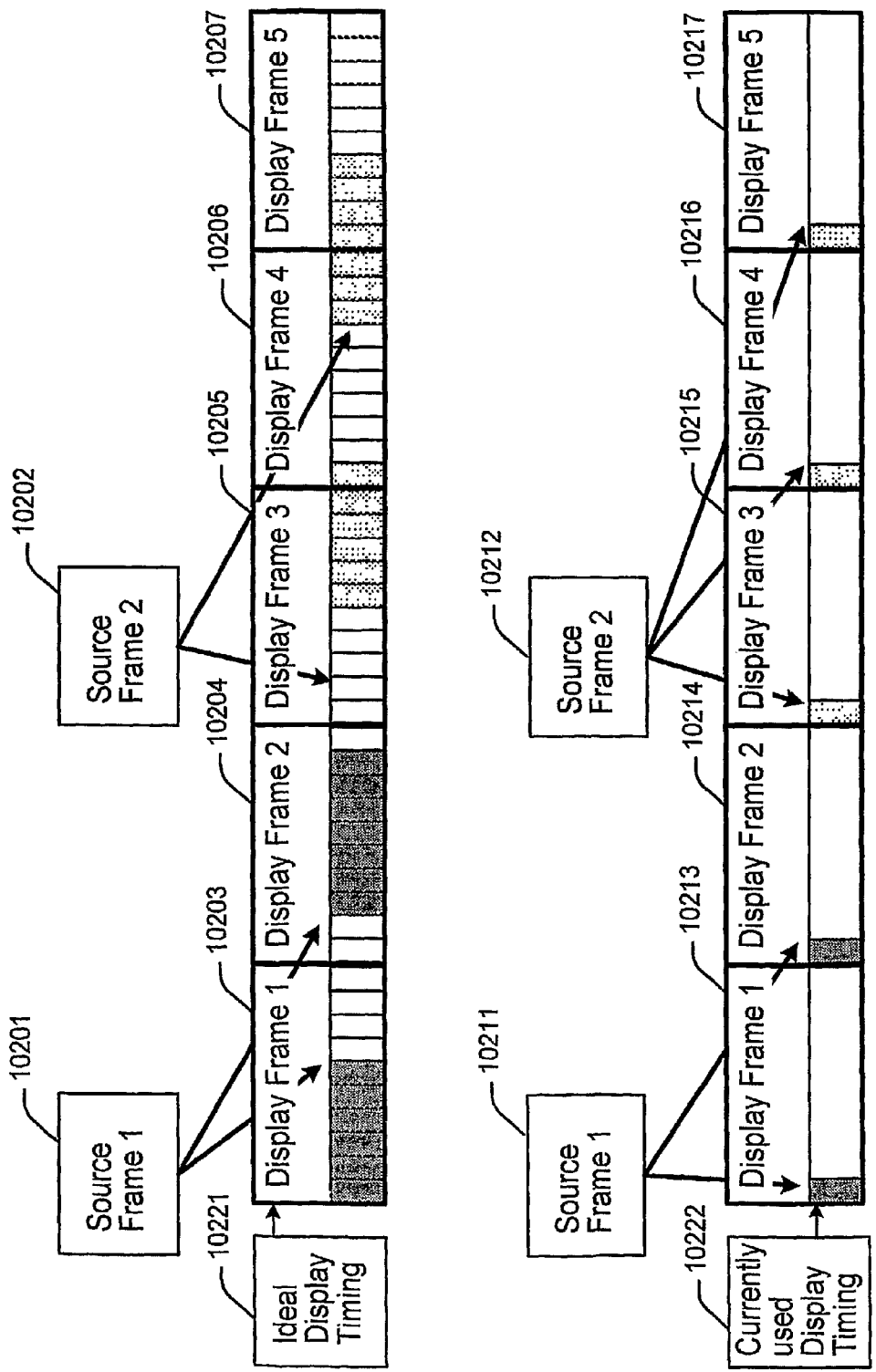
FIG. 11 is a diagram showing an ideal frame timing and currently used timing wherein the present embodiments simulate the ideal timing.

Referring to FIG. 10, emulation of movie judder on a CRT display that runs at 60 Hz in 3:2 pulldown is provided using a lookup table 500. In this case, a more complicated procedure is needed to produce the above mentioned spatio-temporal crosstalk on this particular display. A 5-sequence of frames (N to N+1, 1 to 5, as depicted in FIG. 11), which is inherent to the 3:2 pulldown needed for converting from film material in 24 frames per second to a display refresh rate of 60 Hz, may be employed to illustrate the method. Lookup table 500 includes columns which store information for implementing a transformation between source and display frames. Source frame column 504 and display frame column 506 shown the correlation between source and display frames. Another column 508 expresses spatial filter length as a fraction of pixels on the motion trajectory. A last column 514 depicts an offset as a fraction of pixels on the motion trajectory. These concepts will be further explained below.

Referring to FIG. 11, an ideal display timing 10221 and currently possible display timing 10222 showing 24 frames per second content on a 60 Hz display are illustratively shown. The conventional method 10222 uses a simple repetition of source frame 1 (10211) so that the input frame 1 (10211) is displayed once in display frame 1 (10213) and again once in display frame 2 (10214). Source frame 2 is displayed three times, once in display frame 3 (10215), once in display frame 4 (10216), and once in display frame 5(10217). In case the goal is to have a motion behavior equal to a cinema film projector, there are two problems. First, the display time is too short, so the resultant motion judder is incorrectly high. Second, due to an unequal display duration of source frame 1 (10211) compared to source frame 2 (10212), motion appears somewhat jerky. In an ideal case, the display of source frames 1 and two would appear as in ideal display timing 10221. Under the assumption that with an ideal display, the start point and the end point of a display cycle could be arbitrarily chosen, source frame 1 (10201) is shown for 10.4 milliseconds which is equal to the time between two frames with 24 frames per second, divided by 4, and thus the same as on a conventional film projector. Then, the display is blanked for the same time period and the same source frame is shown once again for 1 another 0.4 milliseconds. The start point of display for source frame 10201 for the second time is delayed to the second display frame (10204) by 4.17 milliseconds. The display of source frame 2 (10202) starts in display frame 3 (10205) with an 8.33 milliseconds delay.

Due to the fact that an ideal display as depicted for ideal display timing (10221) is hardly possible, an inventive method for simulating this has been found. Here, the cross talk in the spatio-temporal domain is used to emulate temporal behavior with spatial filters. The principle of such a directional spatial filter is shown in FIG. 12.

Figure 12:
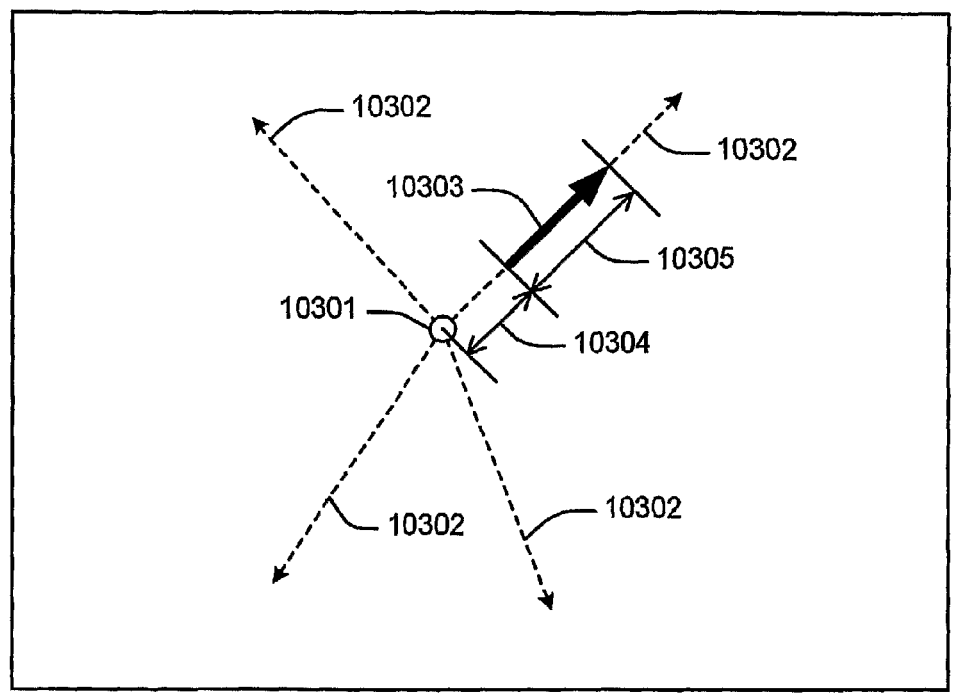
FIG. 12 is a diagram conceptually showing a trajectory, offset, and spatial filter.

Referring to FIG. 12, it is shown that a filter 10303 could have many possible directions 10302, an offset 10304 to a reference point 10301, and a filter length 10305. To implement a motion portrayal of a conventional CRT that is equal to the portrayal of a film projector (as depicted in 10221 of FIG.

11), the direction would be equal to the direction of motion (motion trajectory), the length would be equal to the motion vector length times display time, and the offset would correspond to a delay in display start time.

The motion trajectory is found in a separate block, this motion vector, which has an input vector direction and an input vector length, then has to undergo some post processing using the information given in FIG. 10 and which will be described below. The output of this post processing is a filter direction, a filter length and a filter offset. The filter characteristic may be implemented as a rectangular unity FIR (Finite Impulse Response) filter. FIG. 10 determines the post processing depending on the input source frame relative to the display source frame. As a basis, the post processing follows a modulo 2 function for the source frames and a modulo 5 function for the display frames. Therefore it follows that source frame N is post processed differently to frame N+1, but frame N+1 is post processed the same way as source frame N.

The table in FIG. 10 shows that the source frame (504) number 1 is split in two display segments while the source frame number 2 is split up into four display segments. Source frame number 1 is distributed among 2 display frames (506) and source frame number 2 is distributed among 3 display frames. Therefore, it follows that the directional filter has to be applied twice for source frame number 1 on two display frames and four times on three display frames. Column 508 shows the length multiplier for a motion vector of the individual segment, and column 514 shows the offset as a multiplier to the motion vector. As an example, a motion vector of length 20 pixels is post processed for the second segment of display frame number and the length becomes 0.25*20=5 pixels. Furthermore it has a spatial offset of 0.75*20=15 pixels meaning that the objects affected by the motion trajectory are effectively smoothed with a rectangular low pass filter of 5 pixels and displaced by 15+5/2 pixels from its original position. The portrayed images on a display are more compatible with the filmed images acquired by a camera or as intended by a filmmaker.

Emulation of movie judder on an LCD display, e.g., that works on 48 or 50 Hz in 2:2 pulldown, is more complicated. There is no simple way to emulate film judder on a TFT-LCD that acts like an ideal sample and hold display without hardware modification.

Figure 13:
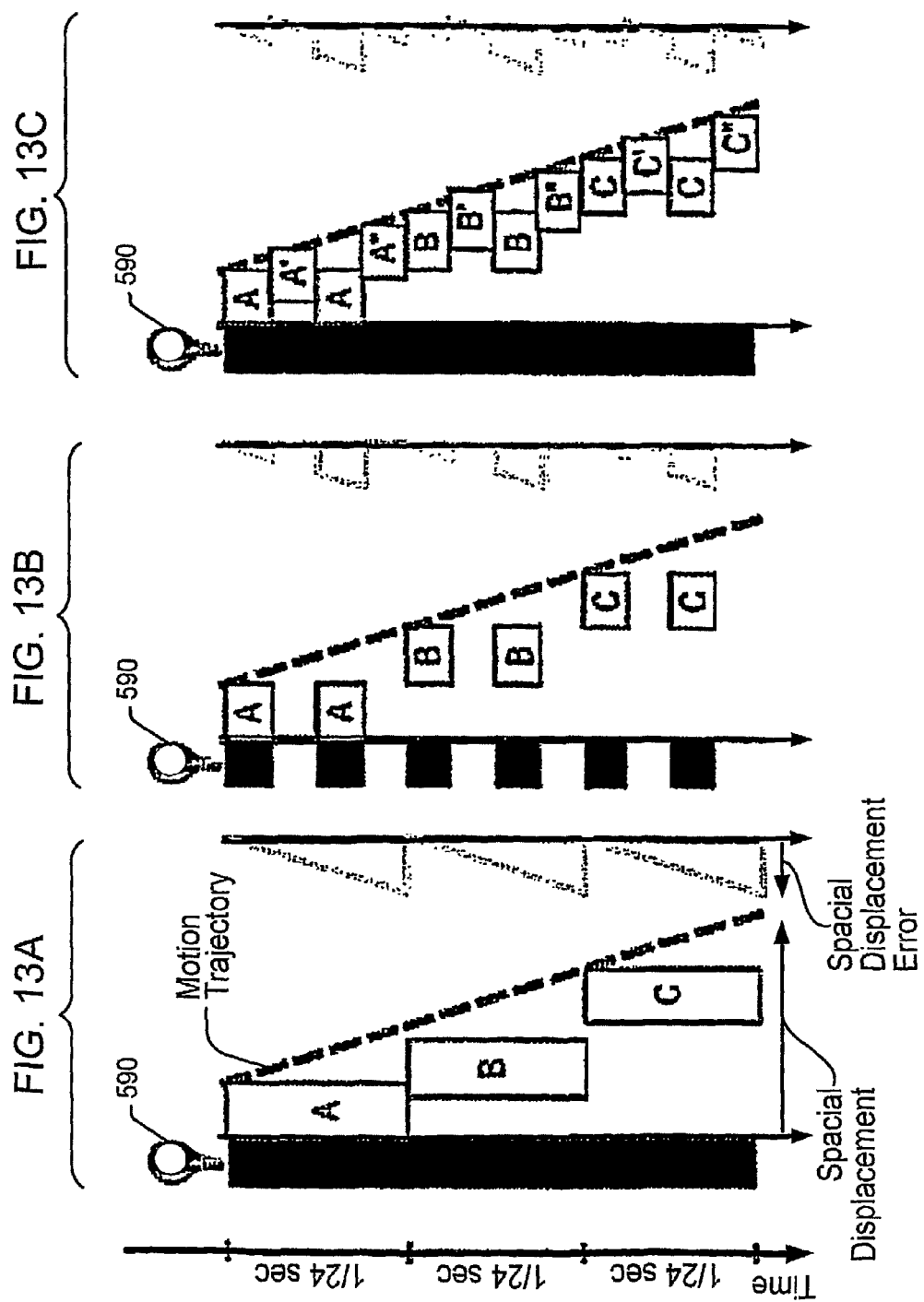
FIG. 13A is a diagram demonstrating concepts of object motion, eye trajectory and displacement error for an LCD display in normal operation.
FIG. 13B is a diagram demonstrating concepts of object motion, eye trajectory and displacement error for an LCD display with a light source modulated in accordance with an illustrative embodiment.
FIG. 13C is a diagram demonstrating concepts of object motion, eye trajectory and displacement error for an LCD display with motion compensation and 4 times driving in accordance with an illustrative embodiment.

Modifications to a sample and hold type display may include modulating a light source of the display to mimic film projection. E.g., a lamp of an LCD display is pulsed with a 48 Hz signal with about a 50% duty cycle. An opportunity is given by using modern type LED backlighting that allows for such modulation without light loss. FIGS. 13A-13C depict different modulation of a lamp source 590 in a sample and hold display type. FIG. 13A shows a film look on an LCD display with data presented at the acquisition ¹/₂₄ rate of ¹/₂₄ seconds. FIG. 13B shows the portrayal of images after modulation of the light source (e.g., 2× the acquisition rate or every ¹/₄₈ seconds). In FIG. 13C, motion compensation is applied and a 4× driving (¹/₉₆ seconds) is employed and illustratively depicted. Note that each period (e.g., ¹/₂₄ seconds) in FIGS. 13A-13C corresponds to a single letter A, B, C indicating the acquisition rate. Each box including a letter includes the refresh rate of the sample and hold display.

Referring to FIG. 13C, constant light is provided but a 4× (24 fps) driving rate (=96 fps) is employed as an example. With the use of motion compensation as described above with the increased driving rate, the movie film judder could be mimicked as shown in FIG. 13C, however, a 4× display may not provide results as good as the results for CRT displays.

However, this concept has no restriction in driving speed. For example, a 3× driving speed is a possibility, of course, with even less film judder emulation. For a 3× driving, a sort of 3:2 pulldown sequence as depicted in FIG. 11 for display timing 10221, should be implemented. This time not for spatial filtering but for motion compensation. On the other hand, with increasing driving speeds like 8×, near perfect to perfect film judder emulations could be achieved in a sample and hold type of display, e.g., on an LCD display. Sample and hold type of displays that run at a display frequency based on 60 Hz could be motion corrected according to a method comprising of a mix of the method for an LC display based on 50 Hz, but of a high display refresh rate, and a spatio-temporal crosstalk modification as given above for CRT displays, however, the filter length after post processing should be shorter than the one for the CRT due to a longer display time.

Figure 14:
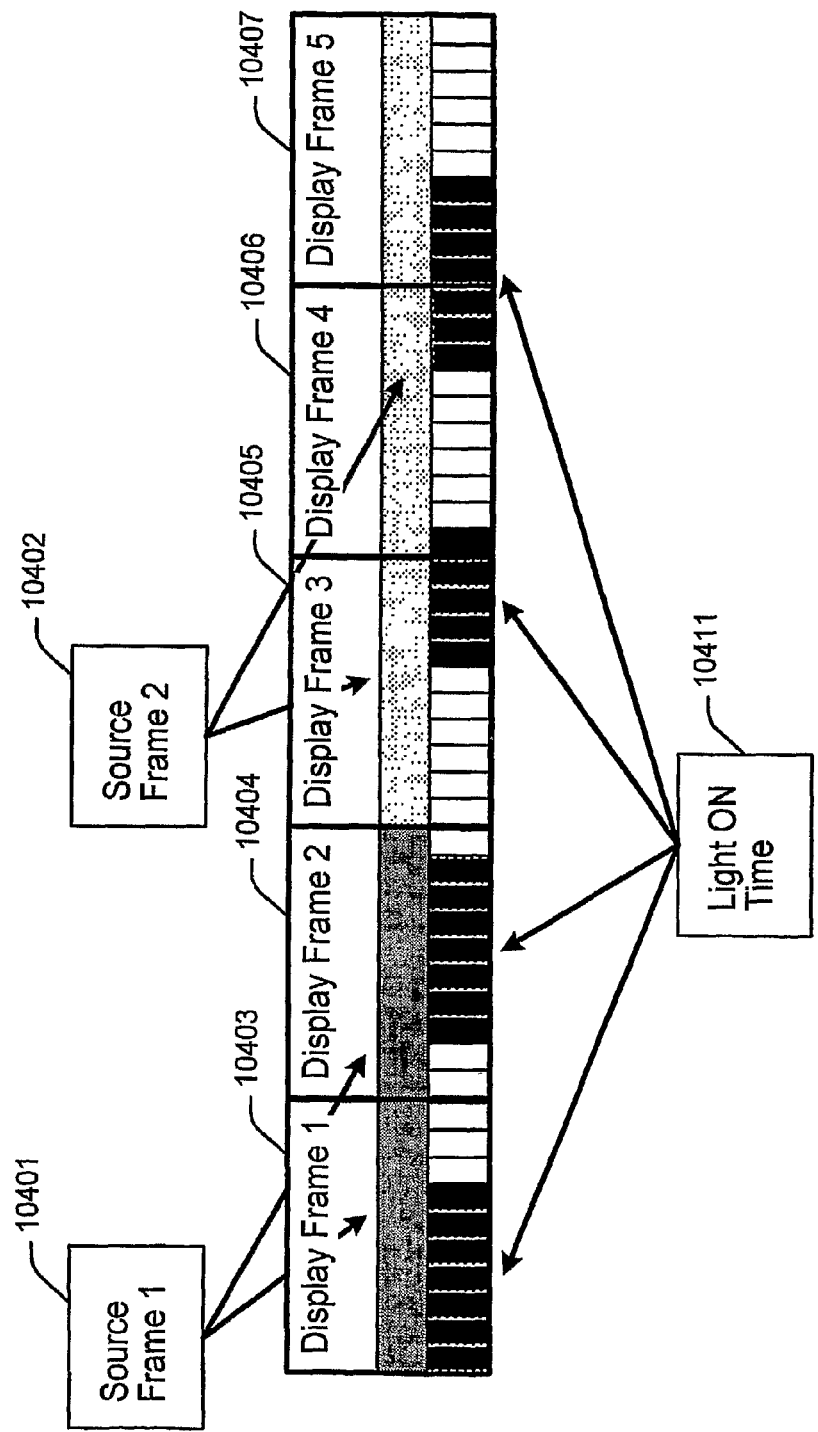
FIG. 14 is a frame timing diagram that shows source and display frames and a light on time for backlighting in accordance with present principles.

Alternatively, as depicted in FIG. 14, the content could be displayed in a standard 3:2 manner in 60 Hz, but the light source would be modulated using a 2×24 Hz half cycle driving scheme as depicted. The interesting part of this is that the source frame selection is similar to the prior art type of driving scheme as is used today in sample and hold (TFT-LCD) displays. Source frame 1 (10401) is displayed twice, in display frames 1 and 2 (10403 and 10404), and that source frame 2 (10402) is displayed three times in display frames 3, 4, and 5 (10405, 10406, 10407). The source frame sequence follows a modulo two rule, so that every frame N is processed as source frame 1 (10401) and that every frame N+1 is processed the same way as source frame 2 (10402), frame N+2 is then processed the same way as source frame 1 (10401) and so forth. In FIG. 14, underneath the display row, there is a "light ON" row 10411 indicating a backlight modulation scheme for achieving an accurate motion rendering which is equal to film projection, as an example. The light on times (10411) follow the same rules as the display start and end times in the "Ideal display timing" 10221 in FIG. 11. The driving is synchronized to the display frame frequency of 60 Hz in such a way that a film theatre like motion portrayal of 24 frames per second can be achieved. This means that two source frames are accurately displayed over the course of 5 display frames. It should be noted that the movie theatre film projection motion portrayal serves just as an example. Of course, other source frame rates and other hold times can be implemented using this method.

Figure 15:
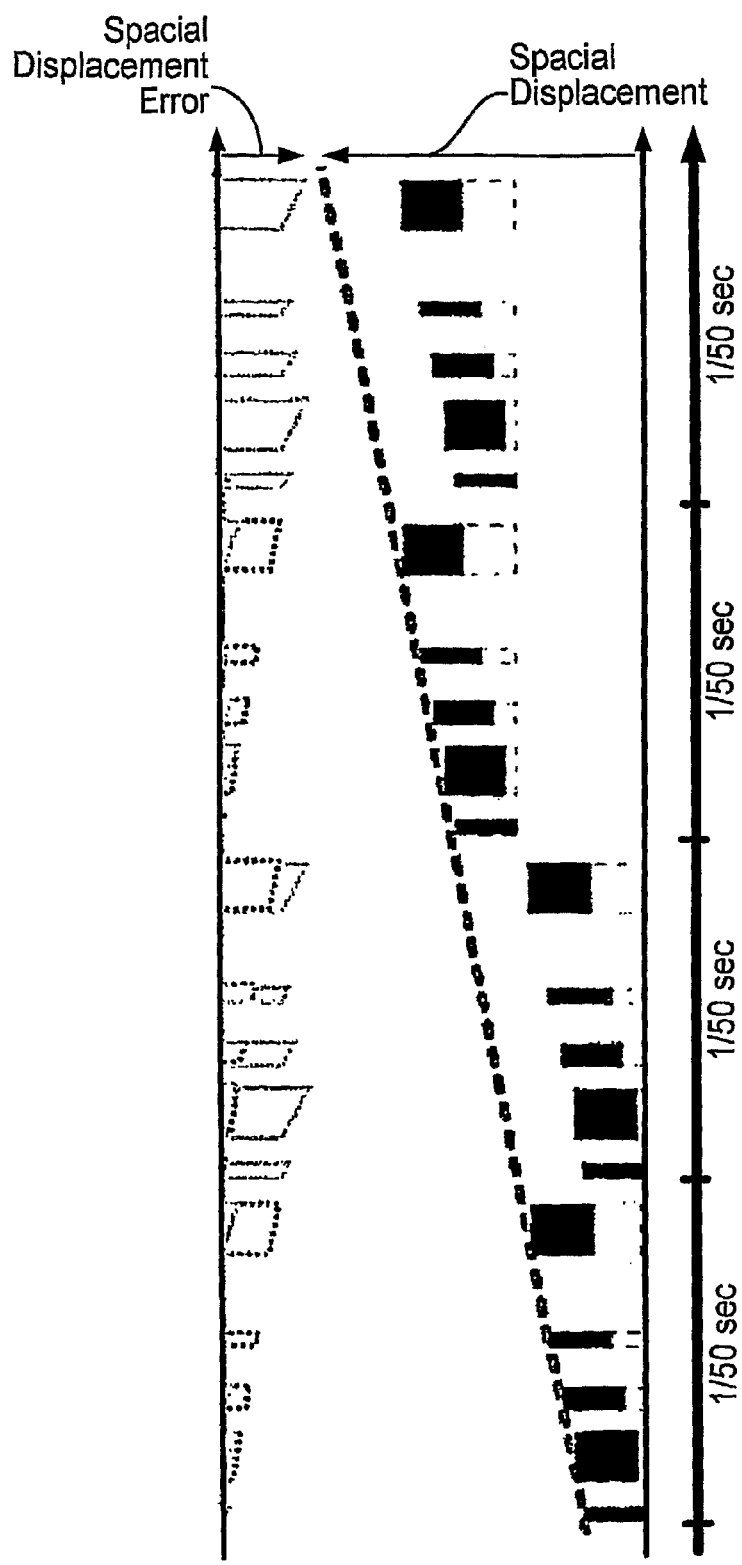
FIG. 15 is a diagram demonstrating concepts of object motion, eye trajectory and displacement error for an ideal pulldown PWM display in accordance with an illustrative embodiment.

Referring to FIG. 15, emulation of movie judder on a PWM display is illustratively shown in accordance with another embodiment. The display may work on 48 or 50 Hz in 2:2 pulldown. For PWM displays, like PLASMA and DLP (also digital cinema projectors), the picture may first be motion compensated so that the non-movie motion judder is eliminated as depicted. In other words, a 48 Hz (or 50 Hz) CRT emulation needs to be performed. From there on, the display can be treated as a CRT, and a spatial filter may be used to emulate the movie judder, in the same manner as described above.

Emulation of movie judder on a PWM display that works on 60 Hz in 3:2 pulldown may also be performed in the same way. With the compensation described above, the PWM display turns into a CRT display behavior-wise. Consequently, from there on, the spatial filtering as described above is also applied.

In accordance with one embodiment, the emulation of in a single shutter mode is addressed. A long standing need includes how to improve motion picture appearance if the double shutter mechanism is eliminated. If eliminated in a film projector, the result would be a terrible flicker. In addressing this issue, a determination of hold time needs to be considered. Advantageously, in accordance with the present principles, the 24 fps frame rate could be displayed without being concerned about flicker. There would be no double imaging due to the frame rate doubling and the motion smearing could be arbitrarily chosen (of course limited by the display technology used).

Arbitrary frame rates could be chosen as well, e.g., 3, 15, 22, etc. Furthermore, the hold time could be arbitrarily chosen to be from 0 to 100% and beyond.

Figure 16:
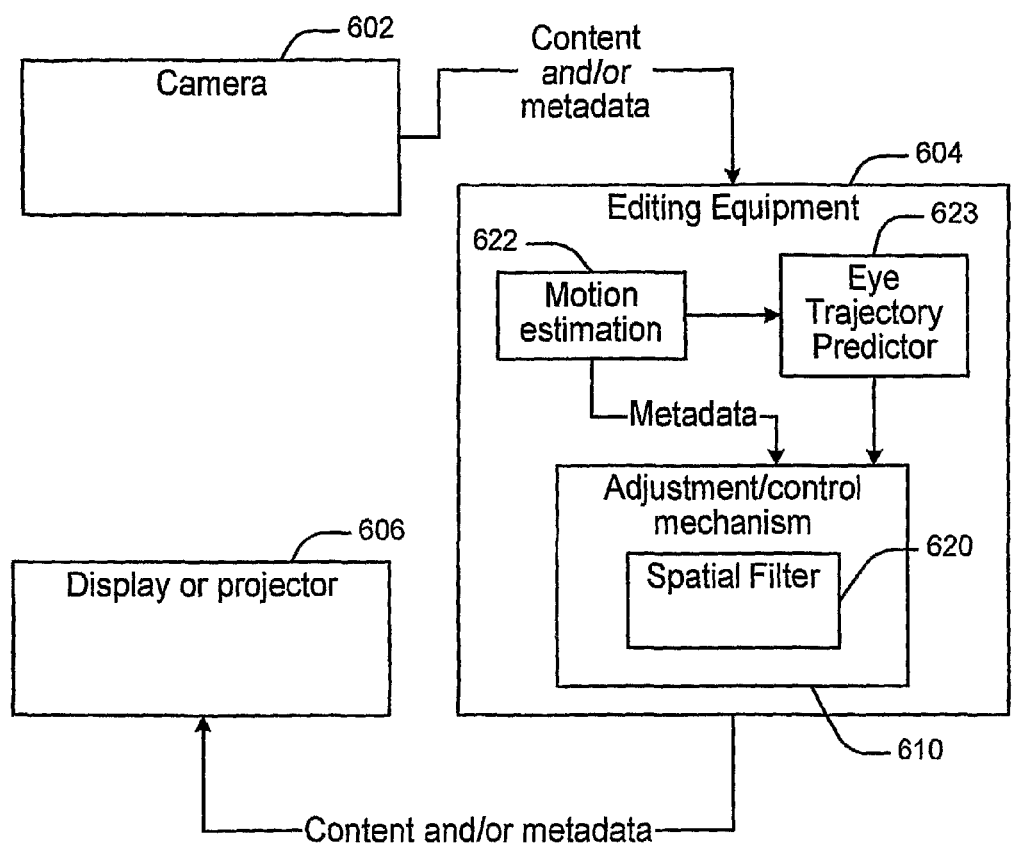
FIG. 16 is a block diagram showing an illustrative system for motion portrayal manipulation in accordance with an illustrative embodiment.

Referring to FIG. 16, an apparatus or system 600 for film judder control is illustratively depicted. System 600 includes a camera 602 for recording or broadcasting film images. Editing equipment 604 may be employed to add metadata (alternately some or all of the metadata may be included by the camera 602) to the film or on a separate media to convey processing information to a display or projector 606, which may be employed to replay the images. Alternately, the display 606 may be capable of determining settings for optimum portrayal of the content based upon the film characteristics. Content may be stored and broadcast or directly broadcast as the case may be. It should therefore be understood that although motion compensation 622, eye trajectory predictor 623 and adjustment/control mechanism 620 are depicted in editing equipment these components may be included in camera 602, display 606 or may be distributed between camera 602, display 606 and editing equipment.

For portraying images on the display 606, a motion estimation or motion compensation of the motion picture is performed by preferably employing the editing equipment 604. In particular, a motion estimation mechanism 622 may be employed to determine moving objects and report information (e.g., in the form of metadata) to an adjustment mechanism or program 610. Moving objects and their positions are determined, and from this motion estimation, eye motion of the viewer is predicted by eye trajectory predictor 623. The eye motion is deemed to follow a region or regions of interest. Methods for motion estimation and eye motion may be performed using adjustment mechanism or program 610 configured to estimate the motion and eye movement based upon a set of rules or other criteria. One skilled in the art would be familiar with video processing tools capable of making such estimations.

The picture is segmented into motion objects or fields. One object is determined as a group of pixels with the same motion trajectory relative to the eye. Again, a determination of the group may be performed by rules or criteria set in mechanism 610. For example, if all pixels in an area are moving at a same relative rate, these pixels may be deemed an object in motion and its trajectory can be determined by comparison with other frames.

A spatial low pass filter 620 is employed to filter along the motion trajectory. The filter is preferably a rectangular, directional filter. The filter length is determined by the number of pixels along the eye motion trajectory that are crossed during one display picture frame divided by 2 (or other number) due to the half cycle shutter, for example. Other factors and shutters may also be employed or simulated. The method is further explained above, in the example of portraying 24 frames per second content in a movie film projector manner on a CRT display running at 60 Hz display refresh rate.

Film judder control via metadata may be added to the film by the editing equipment 604 or camera 602. The metadata may include at least some of the following: 1. input frame rate (from camera) in Hz (e.g., 8 bit integer); 2. field repetition (e.g., the number of fields that are the same display-wise (e.g., 8 bit integer); 3. desired display behavior: e.g., Hold Time, (e.g., 16 bit integer mapped to 0% to 328% in 0.5% steps; 4. preprocessing steps needed: spatial processing (e.g., Yes or No), motion estimation (e.g., Yes or No). (This indicates the presence of preprocessing that has been performed prior to packaging or transmitting the data.); 5. eye motion trajectory (x, y spatial coordinates), (e.g., in 2×32 bit, 1/16 bit precision).

Other metadata or preprocessing may also be performed either at the camera, during editing or at the display. Metadata may include display type specific information; such that the system can portray the video/film in accordance with the filmmaker's intent. In one embodiment, the type of motion displayed on screen may be different for different parts of a movie or video. This may be as a result of changing the parameters or instructions (e.g., through metadata) of the projector or display 606. The metadata may be passed along with the content in order to control the processing on the display side. Of course, the display could as well run in a default mode without metadata.

System 600 may include a motion estimation mechanism 622, which may include an integrated circuit chip or the like. Motion estimation is employed to estimate the frame to frame motion in the source material, an identification of the foreground object motion, and the output of a single motion trajectory for this foreground object by means of a vector.

Having described preferred embodiments for accurate motion portrayal for display and digital projectors (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method for motion portrayal manipulation, comprising:
    determining a region of interest based on eye motion trajectory of a viewer viewing content provided at an acquisition rate, and
    filtering at least one object in the region of interest for adapting motion of the one object for display at the acquisition rate on a display having a refresh rate other than the acquisition rate, wherein the step of filtering includes filtering the objects using a spatial filter having a filter length determined by a number of pixels crossed in the eye motion trajectory modified by a control parameter that is determined by a relationship between an intended display duration versus the actual display duration.

2. The method as recited in claim 1, further comprising the step of portraying the content at the acquisition rate on the display.

3. The method as recited in claim 1, wherein the eye motion trajectory includes a region of interest likely to be focused on by a viewer and determining a trajectory of the region of interest.

4. The method as recited in claim 1, wherein the control parameter includes a film shutter speed.

5. The method as recited in claim 1, wherein the control parameter includes a film rate.

6. The method as recited in claim 1, wherein the display includes one of a cathode ray tube display, a sample and hold display and a pulse-width modulated display.

7. The method as recited in claim 2, wherein the step of portraying further comprises adjusting a refresh rate of the display.

8. The method as recited in claim 1, wherein the display includes a digital projector.

9. The method as recited in claim 1, further comprising the step of segmenting a picture based upon portions of the picture having a same trajectory.

10. The method as recited in claim 9, wherein segmenting a picture includes segmenting the picture based upon groups of pixels with a same motion trajectory relative to the eye trajectory.

11. The method as recited in claim 2, wherein portraying the content includes providing metadata with the content of the video images such that the metadata controls a portrayal behavior of the display device.

12. The method as recited in claim 2, wherein portraying the content includes altering the content to provide a given display portrayal rate.

13. The method as recited in claim 2, wherein portraying the content includes modulating a backlight to control a display portrayal temporal behavior.

14. An apparatus for motion portrayal manipulation, comprising:
a mechanism for determining at least one object in motion in content;
a predictor for predicting an eye trajectory of a viewer viewing the at least one object; and
a controller for filtering the at least one object to adapt motion that object for display at the acquisition rate on a display having a refresh rate other than the acquisition rate, wherein the controller uses a filter with a filter length determined by a number of pixels crossed in the eye motion trajectory divided by a control parameter that is determined by a relationship between an intended display duration versus an actual display duration.

15. The apparatus as recited in claim 14, wherein the content is stored on one of film, a digitally recorded disk, and electronic memory media.

16. The apparatus as recited in claim 14, wherein the content is broadcast.

17. The apparatus as recited in claim 14, wherein the predictor predicts the eye motion trajectory of a viewer based on a trajectory of a region of interest to be focused on by a viewer.

18. The apparatus as recited in claim 14, wherein the controller uses a spatial filter that includes a low-pass rectangular, directional filter.

19. The apparatus as recited in claim 14, wherein the control parameter includes one of a film shutter speed and a film rate.

20. The apparatus as recited in claim 14, wherein the display has a refresh rate that is adjusted to create an appearance of an as-intended look.

21. The apparatus as recited in claim 20, wherein the display includes one of a cathode ray tube display, a sample and hold display and a pulse-width modulated display.

22. The apparatus as recited in claim 14, wherein the mechanism is configured to perform motion estimation for objects in a displayed video image.

23. The apparatus as recited in claim 14, wherein the display includes a digital projector having a temporal behavior such that a refresh rate creates an appearance of the as intended look.

24. The apparatus as recited in claim 14, further comprising editing equipment for providing metadata to the content for translating as intended motion behavior of a displayed image.

25. The apparatus as recited in claim 14, further comprising editing equipment for changing intended motion behavior of content.

* * * * *